United States Patent
Nakamura

(10) Patent No.: US 8,682,530 B2
(45) Date of Patent: Mar. 25, 2014

(54) SUSPENSION SYSTEM FOR A VEHICLE INCLUDING AN ELECTROMAGNETIC ACTUATOR

(75) Inventor: Tomomichi Nakamura, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 334 days.

(21) Appl. No.: 12/678,748

(22) PCT Filed: Apr. 6, 2009

(86) PCT No.: PCT/JP2009/057412
§ 371 (c)(1),
(2), (4) Date: Mar. 18, 2010

(87) PCT Pub. No.: WO2009/128412
PCT Pub. Date: Oct. 22, 2009

(65) Prior Publication Data
US 2010/0207344 A1   Aug. 19, 2010

(30) Foreign Application Priority Data
Apr. 18, 2008  (JP) .................................. 2008-108714

(51) Int. Cl.
| B60G 17/015 | (2006.01) |
| B60G 17/018 | (2006.01) |
| B60G 17/019 | (2006.01) |
| B60G 13/00 | (2006.01) |
| B60G 11/00 | (2006.01) |

(52) U.S. Cl.
USPC ........................... 701/37; 280/1; 280/124.108

(58) Field of Classification Search
USPC ....................... 701/38, 93, 22; 280/5.5, 124.1, 280/124.108, 124.141; 318/603; 188/298
See application file for complete search history.

(56) References Cited

U.S. PATENT DOCUMENTS

| 4,865,347 A | * | 9/1989 | Fukushima et al. | ........ 280/5.508 |
| 4,886,291 A | * | 12/1989 | Okamoto | .................... 280/5.501 |
| 5,089,966 A | * | 2/1992 | Fukushima et al. | ............ 701/38 |
| 5,187,398 A | * | 2/1993 | Stuart et al. | ..................... 310/14 |
| 5,247,234 A | * | 9/1993 | Bitzer et al. | ................... 318/603 |
| 5,350,983 A | * | 9/1994 | Miller et al. | ............. 318/400.08 |

(Continued)

FOREIGN PATENT DOCUMENTS

| JP | 2007 203933 | 8/2007 |
| JP | 2008 195270 | 8/2008 |
| WO | 2008 044384 | 4/2008 |

*Primary Examiner* — Tuan C. To
*Assistant Examiner* — Yuri Kan
(74) *Attorney, Agent, or Firm* — Oblon, Spivak, McClelland, Maier & Neustadt, L.L.P.

(57) ABSTRACT

A suspension system for a vehicle, including: an electromagnetic actuator configured to generate an actuator force and including a sprung-side unit connected to a sprung portion, an unsprung-side unit connected to an unsprung portion, and an electromagnetic motor; a connecting mechanism; and a controller including a target-actuator-force determining portion, the determining portion being configured to determine a target actuator force based on: (a) a required acting force that is a force required to act between the sprung and unsprung portions; and (b) an inertial force of one of the sprung-side and unsprung-side units, while utilizing: a first transfer function by which is outputted an amount of a displacement of the one of the sprung-side and unsprung-side units when the actuator force is inputted; and a second transfer function by which is outputted an actual acting force which actually acts between the sprung and unsprung portions when the displacement amount is inputted.

10 Claims, 7 Drawing Sheets

(56) References Cited

U.S. PATENT DOCUMENTS

| | | | |
|---|---|---|---|
| 5,697,634 A * | 12/1997 | Kamimae et al. | 280/124.108 |
| 7,887,064 B2 * | 2/2011 | Inoue | 280/5.5 |
| 8,041,479 B2 * | 10/2011 | Buma | 701/37 |
| 8,109,371 B2 * | 2/2012 | Kondo et al. | 188/266.3 |
| 2001/0044685 A1 | 11/2001 | Schubert | |
| 2006/0082077 A1 * | 4/2006 | Gouriet et al. | 280/5.5 |
| 2006/0113743 A1 * | 6/2006 | Bryant | 280/124.141 |
| 2006/0283675 A1 * | 12/2006 | Teraoka et al. | 188/298 |
| 2007/0208484 A1 * | 9/2007 | Tsujimura et al. | 701/93 |
| 2008/0059012 A1 * | 3/2008 | Konopa et al. | 701/22 |
| 2009/0120745 A1 | 5/2009 | Kondo et al. | |
| 2010/0200343 A1 * | 8/2010 | Kondo et al. | 188/267 |
| 2010/0207344 A1 * | 8/2010 | Nakamura | 280/124.108 |

* cited by examiner

FIG.7
(a)
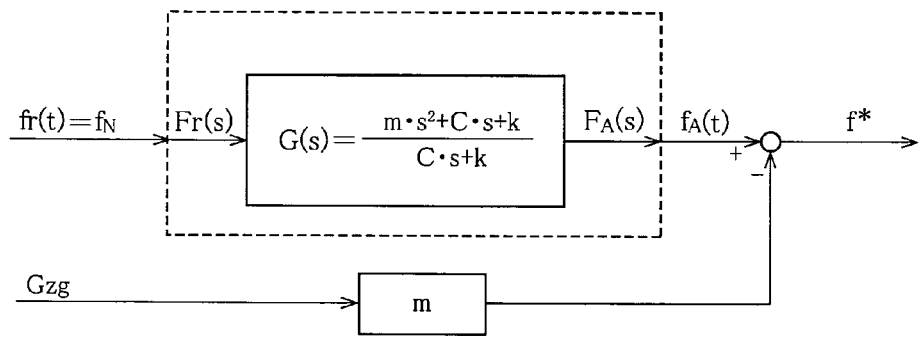
(b)
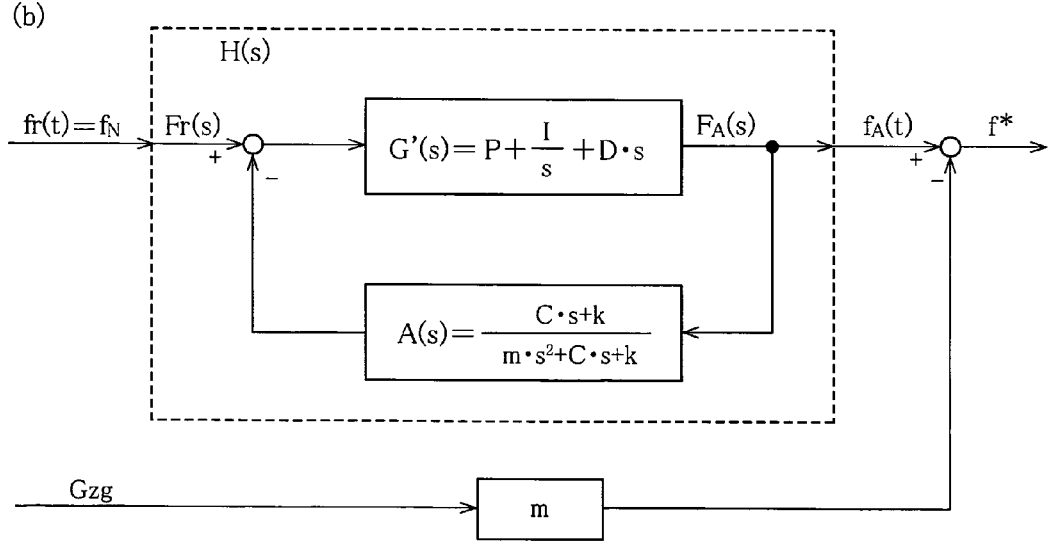

SUSPENSION SYSTEM FOR A VEHICLE INCLUDING AN ELECTROMAGNETIC ACTUATOR

TECHNICAL FIELD

The present invention relates to a suspension system including an electromagnetic actuator.

BACKGROUND ART

In recent years, there has been developed, as a suspension system for a vehicle, the so-called electromagnetic suspension system including an electromagnetic actuator configured to generate, with respect to a sprung portion and an unsprung portion, a force in a direction in which the sprung portion and the unsprung portion are moved toward and away from each other, based on a force of an electromagnetic motor. For instance, the following Patent Document 1 discloses such an electromagnetic suspension system. The disclosed suspension system is expected as a high-performance suspension system in view of an advantage that it is possible to easily realize a vibration damping characteristic based on the so-called skyhook theory because the suspension system can generate a propulsive force with respect to a relative movement of the sprung portion and the unsprung portion.
Patent Document 1 JP-A-2007-203933

DISCLOSURE OF THE INVENTION

(A) Summary of the Invention

In the suspension system disclosed in the above-indicated Patent Document 1, a spring is disposed in series with the electromagnetic actuator for the purpose of dealing with a high-frequency vibration, for instance. In the thus constructed system, however, when the actuator generates an actuator force, the generated actuator force is transmitted to the sprung portion and the unsprung portion via the spring. Accordingly, the suspension system suffers from a problem that the actuator force as generated cannot be transmitted due to a time lag that arises from transmission of the actuator force via the spring, and the like. The present invention has been made in view of the situation described above. It is therefore an object of the invention to provide a suspension system in which a force that acts between the sprung portion and the unsprung portion by the actuator and a connecting mechanism is made appropriate.

To achieve the object indicated above, a suspension system for a vehicle according to the present invention is constituted by including a connecting mechanism for elastically connecting: one of a sprung-side unit and an unsprung-side unit which are constituent elements of the actuator; and one of a sprung portion and an unsprung portion to which the one of the sprung-side unit and an unsprung-side unit is connected, and the present suspension system is characterized by determining a target actuator force on the basis of: (a) a required acting force that is required to act between the sprung portion and the unsprung portion by the actuator and the connecting mechanism; and (b) an inertial force of the one of the sprung-side unit and the unsprung-side unit with respect to a displacement of the one of the sprung portion and the unsprung portion, while utilizing: a first transfer function that is a transfer function by which is outputted an amount of a displacement of the one of the sprung-side unit and the unsprung-side unit relative to the one of the sprung portion and the unsprung portion when the actuator force is inputted; and a second transfer function that is a transfer function by which is outputted an actual acting force that is a force which actually acts between the sprung portion and the unsprung portion when the amount of the displacement is inputted.

In the suspension system according to the invention, the force to be generated by the actuator is determined considering a relationship between the actuator force and the force which actually acts between the sprung portion and the unsprung portion as a result of transmission of the actuator force via the connecting mechanism, and further considering an influence of the displacement of the one of the sprung portion and the unsprung portion to which is connected the one of the sprung-side unit and the unsprung-side unit by the connecting mechanism. Accordingly, the force that acts between the sprung portion and the unsprung portion can be made appropriate.

(B) Forms of Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of the various forms and preferred embodiments. It is to be further understood that any form in which one or more elements is/are added to or deleted from any one of the following forms may be considered as one form of the claimable invention.

(1) A suspension system for a vehicle, comprising:

an electromagnetic actuator including: a sprung-side unit connected to a sprung portion; an unsprung-side unit which is connected to an unsprung portion and which is movable relative to the sprung-side unit in association with a movement of the sprung portion and the unsprung portion toward and away from each other; and an electromagnetic motor, the actuator being configured to generate, based on a force of the electromagnetic motor, an actuator force that is a force with respect to a relative movement of the sprung-side unit and the unsprung-side unit;

a connecting mechanism which includes a support spring for permitting one of the sprung-side unit and the unsprung-side unit to be elastically supported by one of the sprung portion and the unsprung portion to which said one of the sprung-side unit and the unsprung-side unit is connected, the connecting mechanism being configured to connect said one of the sprung-side unit and the unsprung-side unit and said one of the sprung portion and the unsprung portion; and a controller which includes a target-actuator-force determining portion configured to determine, according to a prescribed control rule, a target actuator force that is the actuator force required to be generated by the actuator, the controller being configured to control the actuator force to be generated by the actuator, based on the target actuator force, wherein the target-actuator-force determining portion is configured to determine the target actuator force on the basis of: (a) a required acting force that is a force required to act between the sprung portion and the unsprung portion by the actuator and the connecting mechanism; and (b) an inertial force of said one of the sprung-side unit and the unsprung-side unit with respect to a displacement of said one of the sprung portion and the unsprung portion, while utilizing: a first transfer function that is a transfer function by which is outputted an amount of a displacement of said one of the sprung-side unit and the unsprung-side unit relative to said one of the sprung portion and the unsprung portion when the actuator force is inputted; and a second transfer function that is a transfer function by which is outputted an actual acting force that is a force which actually acts between the sprung portion and the unsprung portion when the amount of the displacement is inputted.

As the suspension system having the electromagnetic actuator, there has been proposed a system in which a spring is disposed in series with the actuator for the purpose of dealing with a high-frequency vibration generated when the vehicle runs on a rough road surface or a road surface with continuous unevenness, for instance. The system according to the above form (1) relates to such a system. Where the suspension system is thus constructed, the actuator force generated by the actuator is transmitted to the sprung portion and the unsprung portion via the support spring. Accordingly, the actuator force as generated cannot be transmitted, causing a difference between the actuator force and the actual acting force which actually acts on the sprung portion and the unsprung portion. More specifically, there is caused a difference between the value of the actuator force and the value of the actual acting force due to a time lag that arises from transmission of the actuator force via the support spring, for instance. Such a difference between the actuator force and the actual acting force causes a problem that the vibration occurring in the vehicle cannot be properly damped, for instance.

According to the form (1), the determination of the target actuator force is based on the required acting force and utilizes the first transfer function and the second transfer function, whereby the target actuator force can be determined taking account of the transmission characteristic of the actuator force relating to the transmission of the actuator force to the sprung portion and the unsprung portion via the connecting mechanism. Accordingly, the force that acts between the sprung portion and the unsprung portion can be made appropriate. That is, the actuator force such as a damping force can be made appropriate.

Where the "first transfer function" and the "second transfer function" described in the form (1) are utilized, the relationship between the actuator force and the actual acting force can be obtained. In short, where the relationship between the actuator force and the actual acting force is taken into account, the actuator force to be generated by the actuator can be determined such that the actual acting force becomes equal to the required acting force. However, the first transfer function and the second transfer function are set taking account of only the movement of one of the sprung-side unit and the unsprung-side unit relative to one of the sprung portion and the unsprung portion. Actually, the one of the sprung portion and the unsprung portion is being displaced at all times. Accordingly, it is desirable to take account of an influence of the displacement of the one of the sprung portion and the unsprung portion. In view of this, in the form (1), the target actuator force is determined based on the required acting force while utilizing the above-indicated first transfer function and second transfer function, and further based on the inertial force of the one of the sprung-side unit and the unsprung-side unit with respect to the displacement of the one of the sprung portion and the unsprung portion. According to the form (1), therefore, the force that acts between the sprung portion and the unsprung portion can be made appropriate by considering the influence of the displacement of the one of the sprung portion and the unsprung portion, ensuring effective vibration damping. Accordingly, it is possible to prevent deterioration in the riding comfort of the vehicle, the steerability and the stability of the vehicle, and so on, arising from the serial arrangement of the connecting mechanism with respect to the actuator.

Each of the first transfer function and the second transfer function may be defined as a ratio of Laplace transformation of an output to Laplace transformation of an input or a ratio of z-transformation of an output to z-transformation of an input (The z-transformation can be explained as Laplace transformation on a discrete group). Concerning the "target-actuator-force determining portion" described in the form (1), a portion thereof for executing the calculation of the two transfer functions is not particularly limited in construction, but may be constituted by including a computing unit such as a circuit for calculating an output value with respect to an input value. Alternatively, the target-actuator-force determining portion may be constituted by including a portion for executing processing according to a program which is stored in a general-purpose computer used also for other control and which is for calculating an output value with respect to an input value.

Where the one of the sprung-side unit and the unsprung-side unit is considered to be displaced in association with the displacement of the one of the sprung portion and the unsprung portion, the "inertial force" described in the form (1) can be considered as a force having a magnitude in accordance with acceleration of the one of the sprung portion and the unsprung portion in the vertical direction. It is noted that the inertial force does not mean only inertial force having a magnitude in accordance with an actual mass of the one of the sprung-side unit and the unsprung-side unit. The inertial force may be determined as follows. Where the actuator includes a screw mechanism for converting, relative to each other, a rotary motion of a rotary motor and the relative movement of the sprung-side unit and the unsprung-side unit, inertial moment of a portion of the constituent elements of the actuator that rotates along with the relative movement of the two units may be converted into inertial mass, and a force having a magnitude that corresponds to the inertial mass may be regarded as a part of the inertial force. That is, in the form (1), the inertial mass may be determined utilizing the so-called equivalent inertial mass.

The "actuator" in the form (1) is not particularly limited in its structure. Various electromagnetic actuators known in the art may be employed. The force generated by the actuator is a force with respect to the relative movement of the sprung-side unit and the unsprung-side unit. The force includes not only a resistance force against the relative movement, but also a force by which the sprung-side unit and the unsprung-side unit are positively moved relative to each other, namely, a propulsive force, and a force by which the relative movement of the two units are prevented against an external force inputted thereto, namely, a retention force. The type of the "electromagnetic motor" of the actuator may not be particularly limited, but may be suitably selected from among various types including a brushless DC motor. In terms of the manner of the movement of the motor, the motor may be a rotary motor or a linear motor.

The "control rule" for determining the target actuator force includes a rule relating to a control for vibration damping, for instance. To be more specific, the control rule includes a rule for executing a control based on the so-called skyhook damper theory for generating a damping force with respect to a vibration of the sprung portion (i.e., sprung vibration). The rule may be for concurrently executing, in addition to the vibration damping control, a roll restrain control for restraining roll of the vehicle body arising from turning of the vehicle, a pitch restrain control for restraining pitch of the vehicle body arising form acceleration and deceleration of the vehicle, and a control for adjusting the distance between the sprung portion and the unsprung portion, namely, a height adjusting control. Where the control rule is for concurrently executing a plurality of controls, a sum of the components of the actuator force in the respective controls is made as the required acting force and the target actuator force may be determined based on the required acting force, the two transfer functions, and the inertial force.

The "connecting mechanism" in the form (1) can be provided mainly for dealing with a vibration whose frequency is relatively high, for instance. While the connecting mechanism may be constructed so as to include a support spring as a main constituent element, the connecting mechanism may include a hydraulic damper which will be explained in detail, for damping a vibration generated by the provision of the support spring. The support spring may have any structure. Where the connecting mechanism includes the hydraulic damper as explained below, a coil spring may be employed. In this instance, the damper as a cylinder device is disposed so as to be inserted through the coil spring or disposed in the coil spring, whereby the suspension system which is compact in size can be realized.

The term "connect" used in the present specification means not only direct connection but also indirect connection in which elements are connected indirectly to each other with a certain component, member, unit or the like interposed therebetween. For instance, where the sprung-side unit and the unsprung-side unit are connected to the sprung portion and the unsprung portion, respectively, those units may be connected directly to the sprung portion and the unsprung portion or indirectly to the sprung portion and the unsprung portion via the spring, the hydraulic damper or the like interposed therebetween.

(2) The suspension system according to the form (1), wherein a composite transfer function is set as a reciprocal function of a function that is a product of the first transfer function and the second transfer function, and wherein the target-actuator-force determining portion is configured to determine the target actuator force on the basis of an output value obtained by inputting the required acting force into the composite transfer function; and the inertial force.

(3) The suspension system according to the form (2), wherein the target-actuator-force determining portion is configured to determine the target actuator force according to a relationship between the output value obtained by inputting the required acting force into the composite transfer function and the inertial force, the relationship indicating that a difference between the output value and the target actuator force corresponds to the inertial force.

In the above two forms (2) and (3), the technique of calculating the target actuator force is embodied. The "composite transfer function" described in the above two forms is a transfer function by which is outputted the value of the actuator force when the actual acting force is inputted thereto. That is, by inputting the required acting force into the composite transfer function, the actuator force to be generated by the actuator is outputted. However, because the output value indicative of the actuator force outputted from the composite transfer function does not take account of the displacement of the one of the sprung portion and the unsprung portion as described above, the output value that is outputted from the composite transfer function may be corrected based on the inertial force. More particularly, as in the latter form (3), the inertial force may be added to or subtracted from the output value of the composite function considering the direction in which the inertial force works, whereby the target actuator force is determined.

(4) The suspension system according to any one of the forms (1)-(3), wherein the connecting mechanism is configured to connect: the unsprung-side unit as said one of the sprung-side unit and the unsprung-side unit; and the unsprung portion as said one of the sprung portion and the unsprung portion and is configured such that the support spring permits the unsprung-side unit to be elastically supported by the unsprung portion, and wherein the target-actuator-force determining portion is configured to determine the target actuator force on the basis of the required acting force and the inertial force of the unsprung-side unit with respect to a displacement of the unsprung portion, while utilizing: the first transfer function by which is outputted an amount of a displacement of the unsprung-side unit relative to the unsprung portion when the actuator force is inputted; and the second transfer function by which is outputted the actual acting force that is a force which actually acts between the sprung portion and the unsprung portion when the amount of the displacement is inputted.

According to the above form (4), the connecting mechanism is disposed between the unsprung portion and the unsprung-side unit of the actuator, whereby the shock inputted from the wheel and transmitted to the actuator is mitigated and the high-frequency vibration such as unsprung resonance is dealt with. According to the form (4), therefore, the shock transmitted to the electromagnetic motor and the high-frequency vibration can be effectively suppressed, so that the suspension system with high reliability is realized.

In an instance where the wheel passes on projections and depressions of the road surface, for example, the unsprung portion is moved vigorously, so that the unsprung-side unit is moved vigorously. Accordingly, it is considered that a situation in which the inertial force of the unsprung-side unit becomes relatively large often occurs. In the form (4), the target actuator force is determined taking account of the inertial force of the unsprung-side unit with respect to the displacement of the unsprung portion, so that the actuator force can be made more appropriate.

(5) The suspension system according to any one of the forms (1)-(4), wherein the connecting mechanism includes a damper disposed in parallel with the support spring and configured to generate a damping force with respect to a relative movement of said one of the sprung-side unit and the unsprung-side unit and said one of the sprung portion and the unsprung portion.

(6) The suspension system according to the form (5), wherein the first transfer function and the second transfer function are set based on a damping coefficient of the damper.

In the above two forms (5) and (6), there is employed a connecting mechanism in which the hydraulic damper is disposed in parallel to the support spring. The "damper" may be provided for assisting the support spring, namely, for damping the vibration having a relatively high frequency. According to the above two forms, therefore, it is possible to effectively damp the high-frequency vibration such as unsprung resonance. While the structure of the damper is not particularly limited, the damper may have a structure as a cylinder device having a housing, a piston, and so on. Where the connecting mechanism includes the damper, the first transfer function and the second transfer function are set using the damping coefficient of the damper as described in the latter form (6).

(7) The suspension system according to the form (6),
wherein the damper is configured such that the damping coefficient thereof is made different depending upon a direction of the relative movement of said one of the sprung-side unit and the unsprung-side unit and said one of the sprung portion and the unsprung portion, and wherein the target-actuator-force determining portion is configured to change the first transfer function and the second transfer function to be utilized, depending upon the direction of the relative movement.

In the "damper" according to the above form (7), the damping coefficient thereof in a stroke in which the one of the sprung-side unit and the unsprung-side unit and the one of the sprung portion and the unsprung portion are moved toward each other is made different from the damping coefficient in a stroke in which the one of the sprung-side unit and the unsprung-side unit and the one of the sprung portion and the unsprung portion are moved away from each other. For instance, the damping coefficient may be made smaller in the stroke of moving toward each other than the damping coefficient in the stroke of moving away from each other, for the purpose of effectively mitigating a thrusting shock that occurs when the wheel passes on projections of the road surface, for instance. Where the connecting mechanism has the damper, the first transfer function and the second transfer function are set using the damping coefficient of the damper. Accordingly, the form (7) may be arranged such that the first transfer function and the second transfer function are changed between those which are set using the damping coefficient in the stroke of moving toward each other and those which are set using the damping coefficient in the stroke of moving away from each other. According to the form (7), the direction of the relative movement of the one of the sprung-side unit and the unsprung-side unit and the one of the sprung portion and the unsprung portion is estimated, and the target actuator force is determined depending upon the direction, whereby the magnitude of the force that acts between the sprung portion and the unsprung portion can be made more appropriate.

(8) The suspension system according to the form (7), further comprising: a movement-amount sensor for detecting an amount of the movement of the sprung portion and the unsprung portion toward and away from each other; and a motor-operation-amount sensor for detecting an operation amount of the electromagnetic motor, wherein the target-actuator-force determining portion is configured to estimate the direction of the relative movement of said one of the sprung-side unit and the unsprung-side unit and said one of the sprung portion and the unsprung portion, on the basis of a value detected by the movement-amount sensor and a value detected by the motor-operation-amount sensor.

In the above form (8), the technique of estimating the direction of the relative movement of the one of the sprung-side unit and the unsprung-side unit and the one of the sprung portion and the unsprung portion is embodied. The actuator is constructed such that the relative movement of the sprung-side unit and the unsprung-side unit and the operation of the motor are interrelated. Accordingly, the amount of the relative movement of the sprung-side unit and the unsprung-side unit (hereinafter referred to as "unit-relative-movement amount" where appropriate) can be estimated from the detected value of the motor-operation-amount sensor. Therefore, the direction of extension and contraction of the damper can be estimated from a change in the difference between the amount of the movement of the sprung portion and the unsprung portion toward and away from each other detected by the movement-amount sensor and the unit-relative-movement amount estimated from the detected value of the motor-operation-amount sensor. Because the movement-amount sensor and the motor-operation-amount sensor are those required in the ordinary control of the actuator and the like executed by the suspension system, the form (8) eliminates provision of additional sensors, preventing the system from being complicated.

BRIEF DESCRIPTION OF THE DRAWINGS

FIG. 7($a$) is a block diagram of a target-actuator-force determining portion in the embodiment of the claimable invention and FIG. 7($b$) is a block diagram of a target-actuator-force determining portion in a modified embodiment.

EMBODIMENTS

There will be explained in detail one embodiment of the claimable invention and its modified embodiment with reference to the drawings. It is to be understood, however, that the claimable invention is not limited to the following embodiments but may be embodied with various changes and modifications, such as those described in the FORMS OF THE INVENTION, which may occur to those skilled in the art. It is to be further understood that a modified embodiment of the following embodiment is provided by utilizing the technical matters described in the explanation of each of the forms in the FORMS OF THE INVENTION.

1. Structure of Suspension System

Figure 1:
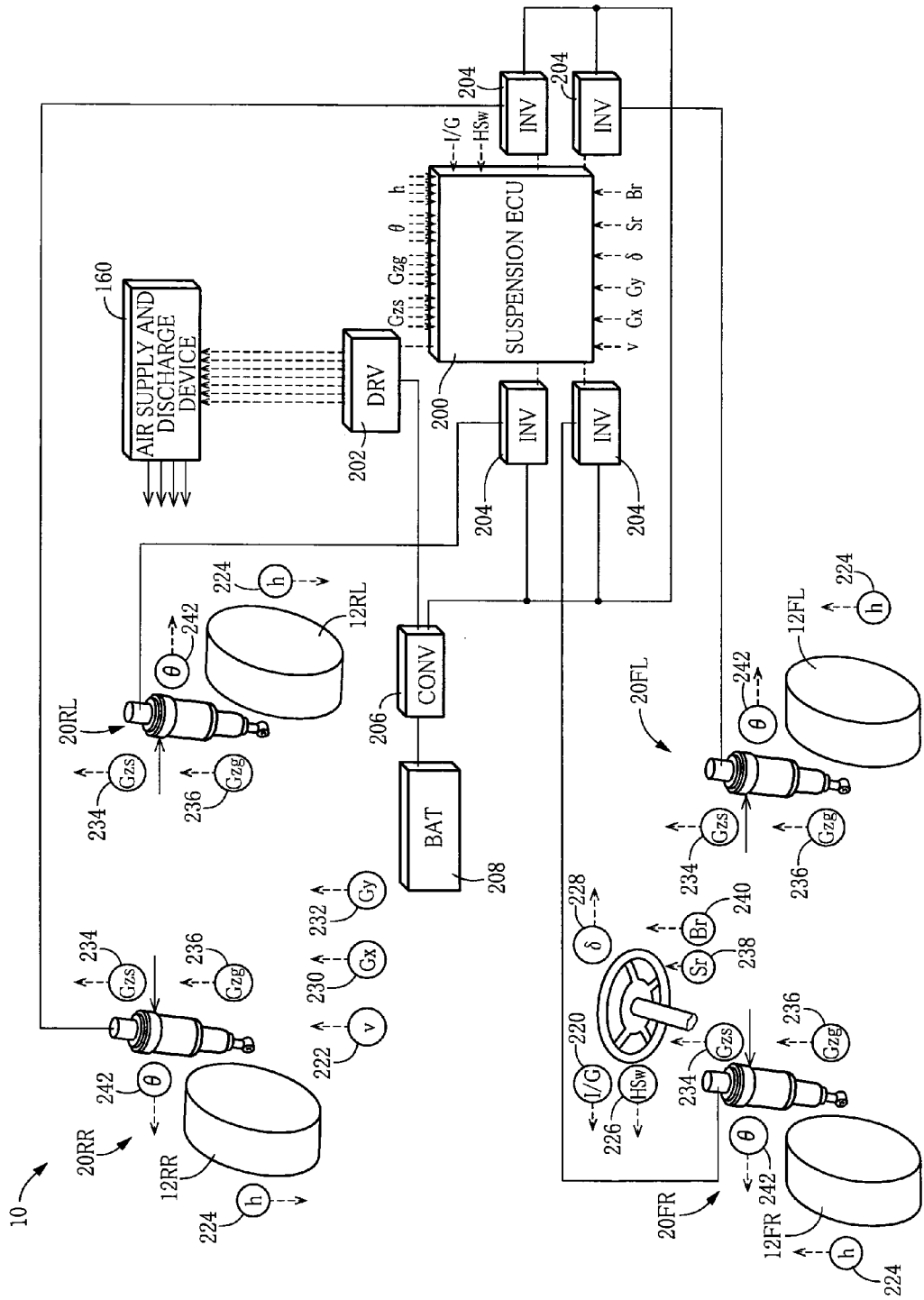
FIG. 1 is a schematic view illustrating an overall structure of a suspension system for a vehicle according to one embodiment of the claimable invention.

FIG. 1 schematically shows a suspension system 10 for a vehicle according to one embodiment of the claimable invention. The suspension system 10 includes four independent suspension apparatus which respectively correspond to four wheels 12, namely, a front left wheel, a front right wheel, a rear left wheel, and a rear right wheel. Each of the suspension apparatus includes a spring-absorber Assy 20 in which a suspension spring and a shock absorber are united. The four wheels 12 and the four spring-absorber Assys 20 are collectively referred to as the wheel 12 and the spring-absorber Assy 20, respectively. Where it is necessary to distinguish the four wheels 12 from each other and to distinguish the four spring-absorber Assys 20 from each other, there are attached suffixes "FL", "FR", "RL", and "RR" respectively indicating the front left wheel, the front right wheel, the rear left wheel, and the rear right wheel.

Figure 2:
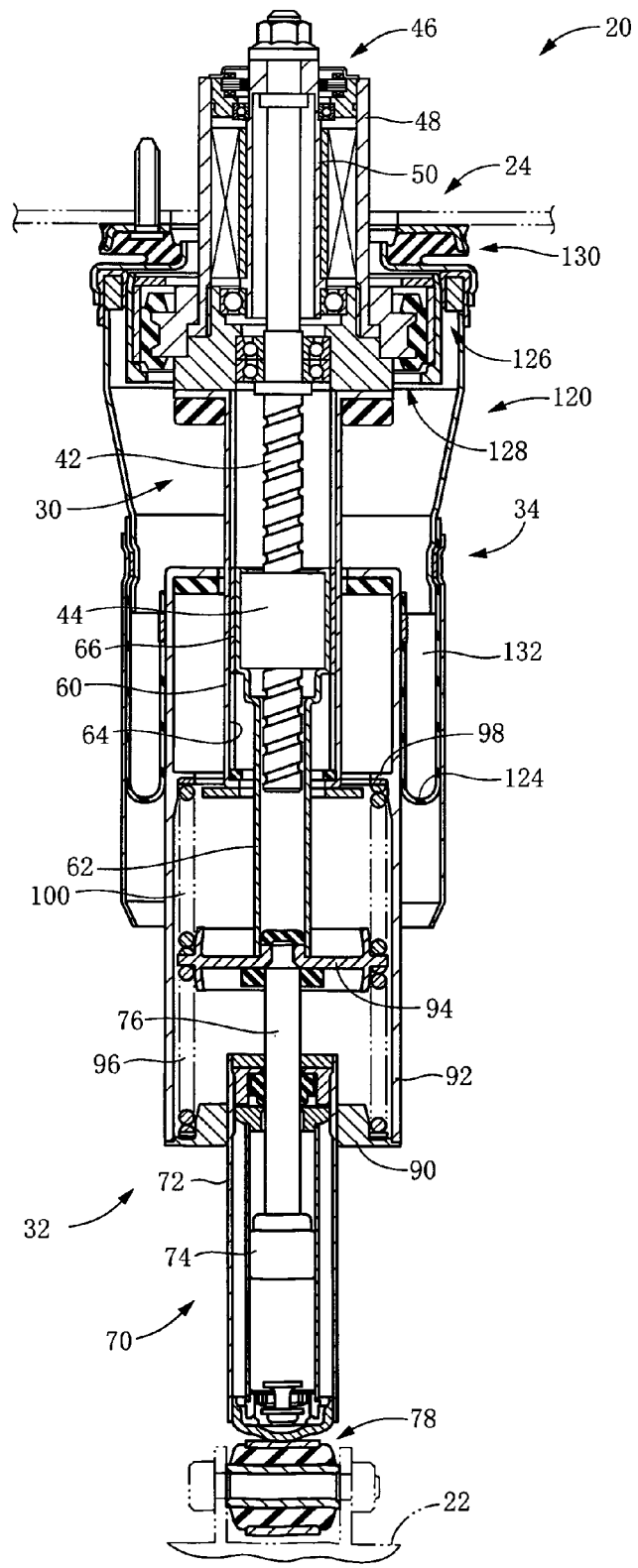
FIG. 2 is a front elevational view in cross section illustrating a spring-absorber Assy shown in FIG. 1.

As shown in FIG. 2, the spring-absorber Assy 20 is disposed between a suspension lower arm 22 holding the wheel 12 and partially constituting an unsprung portion and a mount portion 24 disposed on a vehicle body and partially constituting a sprung portion, so as to connect the suspension lower arm 22 and the mount portion 24. The spring-absorber Assy 20 is generally segmented into an electromagnetic actuator 30, a connecting mechanism 32 for connecting the actuator 30 and the lower arm 22, and an air spring 34 as a suspension spring. The spring-absorber Assy 20 includes, as its constituent elements, the actuator 30, the connecting mechanism 32, and the air spring 34, which are united.

The actuator 30 includes a ball screw mechanism, an electromagnetic motor 46 of a rotary type (hereinafter simply referred to as "motor 46" where appropriate), and a casing 48 which accommodates the motor 46. The ball screw mechanism includes a threaded rod 42, as an external thread portion, in which a thread groove is formed, and a nut 44, as an internal thread portion, which holds bearing balls and which is screwed with the threaded rod 42. The casing 48 rotatably holds the threaded rod 42 and is connected at its outer circumferential portion to the mount portion 24. The motor 46 has a hollow motor shaft 50. The threaded rod 42 passing through the motor shaft 50 is fixed to an upper end portion of the motor shaft 50. That is, the motor 46 is configured to give a rotational force to the threaded rod 42.

The actuator 30 includes an outer tube 60 fixed at its upper end to the casing 48 with the threaded rod 42 inserted therethrough and a stepped inner tube 62 fitted into the outer tube 60 and protruding downwardly from a lower end portion of the outer tube 60. The inner tube 62 has a large-diameter upper end portion in which is held the nut 44 such that the nut 44 is screwed with the threaded rod 42. The outer tube 60 is formed with, on its inner wall surface, a pair of guide grooves 64 that extend in a direction in which an axis of the actuator 30 extends (hereinafter referred to as "axis direction" where appropriate). Into the pair of guide grooves 64, a pair of keys 66 provided at the upper end portion of the inner tube 62 are fitted. Owing to the guide grooves 64 and the keys 66 fitted therein, the outer tube 60 and the inner tube 62 are allowed to be relatively movable in the axis direction while being unrotatable to each other. The inner tube 62 is connected at its lower end portion to the connecting mechanism 32.

The connecting mechanism 32 has a hydraulic damper 70. While the structure of the damper 70 is not described in detail, the damper 70 has a structure similar to that of a hydraulic shock absorber of a twin tube type. The damper 70 includes a housing 72 in which a working fluid is accommodated, a piston 74 fluid-tightly and slidably fitted in an inside of the housing 72, and a piston rod 76 connected at its lower end to the piston 74 and extending upwardly from an upper end portion of the housing 72. The housing 72 is connected to the lower arm 22 via a bush 78 provided at a lower end of the housing 72. The piston rod 76 is connected, at its upper end portion that extends upwardly from the upper end portion of the housing 72, to the lower end portion of the inner tube 62. According to the structure, the inner tube 62 is connected to the lower arm 22 via the damper 70.

An annular lower retainer 90 is fixed to an outer circumferential portion of the housing 72 of the damper 70. A cover tube 92 that accommodates the inner tube 62, the lower end portion of the outer tube 60, and the upper portion of the damper 70 is fixed, at its lower end portion, to the lower retainer 90. A floating member 94 is fixed to a joint portion of the inner tube 62 and the piston rod 76. The floating member 94 is held by and between: a compression coil spring 96 disposed between the floating member 94 and the lower retainer 90; and a compression coil spring 100 disposed between the floating member 94 and an annular projecting portion 98 functioning as an upper retainer and formed in an inside of the cover tube 92.

The air spring 34 includes a chamber shell 120 fixed to the mount portion 24, the cover tube 92 functioning as an air piston cylinder, and a diaphragm 124 connecting the chamber shell 120 and the cover tube 92. The chamber shell 120 is connected, at its cap portion 126, to the casing 48 of the actuator 30 via a spring support 128 that has a vibration damping rubber. The cap portion 126 of the chamber shell 120 is connected to the mount portion 24 via an upper support 130 having a vibration damping rubber. The diaphragm 124 is fixed at one end thereof to a lower end portion of the chamber shell 120 and at another end thereof to an upper end portion of the cover tube 92. The chamber shell 120, the cover tube 92, and the diaphragm 124 cooperate with each other to define a pressure chamber 132 in which compressed air as a fluid is filled. Owing to the structure, the lower arm 22 and the mount portion 24, namely, the wheel and the vehicle body, are elastically supported relative to each other by the pressure of the compressed air of the air spring 34. It is noted that a spring constant in an instance where the above-indicated compression coil springs 96, 100 are supposed to constitute a single spring is made larger than a spring constant of the air spring 34.

In the structure described above, the actuator 30 includes: a sprung-side unit including the threaded rod 42, the motor 46, the casing 48, the outer tube 60, etc., and connected to the mount portion 24; and an unsprung-side unit including the nut 44, the inner tube 62, the floating member 94, etc., and connected to the lower arm 22. The actuator 30 is configured such that the sprung-side unit and the unsprung-side unit are unrotatable relative to each other and are movable relative to each other in the axis direction in association with the movement of the sprung portion and the unsprung portion toward and away from each other. The connecting mechanism 32 indicated above is disposed between (a) the unsprung-side unit as one of the sprung-side unit and the unsprung-side unit and (b) the unsprung portion as one of the sprung portion and the unsprung portion that is connected to the unsprung-side unit. The connecting mechanism 32 is configured to connect the unsprung-side unit and the unsprung portion. The two compression coil springs 96, 100 function as one support spring. (Hereinafter, the compression coil springs 96, 100 are referred to as "support spring 96, 100".)

The actuator 30 is configured such that, when the sprung portion and the unsprung portion move toward and away from each other, the sprung-side unit and the unsprung-side unit are movable relative to each other in the axis direction, namely, the threaded rod 42 and the nut 44 are movable relative to each other in the axis direction, and the threaded rod 42 rotates relative to the nut 44 in association with the relative movement. Accordingly, the motor shaft 50 rotates. The motor 46 can give a rotational torque to the threaded rod 42. Owing to the rotational torque, it is possible to generate a resistance force against the relative rotation of the threaded rod 42 and the nut 44, in a direction to prevent the relative rotation. The resistance force is applied as a damping force with respect to the relative movement of the sprung-side unit and the unsprung-side unit, and accordingly, as a damping force with respect to the movement of the sprung portion and the unsprung portion toward and away from each other, whereby the actuator 30 functions as the so-called shock absorber. In addition, the actuator 30 is capable of generating a propulsive force with respect to the relative movement of the sprung portion and the unsprung portion. Accordingly, the system 10 is capable of executing a control on the basis of the so-called skyhook damper theory, quasi groundhook damper theory, and the like. Further, it is possible to keep, owing to the rotational torque of the motor 46, a distance between the sprung portion and the unsprung portion at an arbitrary distance, whereby roll of the vehicle body upon turning and pitch of the vehicle body upon acceleration and deceleration of the vehicle can be effectively restrained or suppressed and the height of the vehicle can be adjusted. The distance between the sprung portion and the unsprung portion is hereinafter referred to as "a sprung-unsprung distance" where appropriate.

The unsprung-side unit of the actuator 30 and the lower arm 22 are connected by the connecting mechanism 32 which includes the damper 70 and the compression coil springs 96, 100. The damper 70 is configured to generate a damping force with respect to a relative movement of the unsprung-side unit and the unsprung portion, whereby a relative vibration of the unsprung-side unit and the unsprung portion can be effectively damped. While not explained in detail, the damper 70 is configured such that the damping coefficient thereof in its contraction stroke and the damping coefficient in its extension stroke are mutually different from each other. More specifically, a damping coefficient Cc in the contraction stroke, namely, in an instance where the unsprung-side unit and the unsprung unit are moved toward each other is made smaller than a damping coefficient Ct in the extension stroke, namely, in an instance where the unsprung-side unit and the unsprung portion are moved away from each other, for the purpose of effectively mitigating a shock which thrusts up the wheel when the wheel passes on projections on the road surface.

When focusing on the vibration damping function of the actuator 30, the movement of the actuator 30 smoothly follows with respect to a low-frequency vibration of 5 Hz or lower, whereby such a low-frequency vibration can be effectively damped. It is, however, difficult to effectively damp a high-frequency vibration exceeding 10 Hz because the movement of the actuator 30 is unlikely to follow. In the present spring-absorber Assy 20, the actuator 30 and the lower arm 22 are connected by the connecting mechanism 32 indicated above, so that transmission of such a high-frequency vibration exceeding 10 Hz from the unsprung portion to the sprung portion can be effectively suppressed by the connecting mechanism 32.

As shown in FIG. 1, the suspension system 10 has a fluid inflow and outflow device for permitting air as a fluid to flow into and flow out of the air spring 34 of each spring-absorber Assy 20, more particularly, an air supply and discharge device 160 that is connected to the pressure chamber 132 of each air spring 34 so as to supply the air into the pressure chamber 132 and discharge the air from the same 132. While not explained in detail, the air amount in the pressure chamber 132 of each air spring 34 can be adjusted by the air supply and discharge device 160 in the thus constructed suspension system 10. By adjusting the air amount, a spring length of each air spring 34 can be changed and the sprung-unsprung distance for each wheel 12 is thereby changed. More specifically, the air amount in the pressure chamber 132 is increased for thereby increasing the sprung-unsprung distance while the air amount in the pressure chamber 132 is decreased for thereby decreasing the sprung-unsprung distance. In other words, the present system 10 is capable of adjusting the vehicle height.

In the suspension system 10, the spring-absorber Assy 20 is operated by a suspension electronic control unit 200 as a controller (hereinafter referred to as "ECU 200" where appropriate), namely, the actuator 30 and the air spring 34 are controlled by the ECU 200. The suspension ECU 200 is constituted principally by a computer equipped with a CPU, a ROM, a RAM, etc. To the suspension ECU 200, there are connected: a driver 202 as a drive circuit for the air supply and discharge device 160; and inverters 204 provided so as to correspond to the respective motors 46 of the actuators 30. Each of the inverters 204 functions as a drive circuit for controlling the corresponding motor 46. The suspension ECU 200 controls the air springs 34 by controlling the driver 202 and controls the actuator force generated by each of the actuators 30 by controlling the four inverters 204. The driver 202 and the inverters 204 are connected to a battery [BAT] 208 via a converter [CONV] 206. An electric power is supplied from an electric power source constituted by including the converter 206 and the battery 208 to control valves, a pump motor and the like, of the air supply and discharge device 160, and the motors 46 of the respective actuators 30. The inverter 204 is configured such that the electric power generated by motor 46 owing to the electromotive force can be regenerated into the electric power source. The motor 46 is configured to generate not only the motor force that depends on a supply current that is an electric current supplied from the electric power source to the motor 46, but also the motor force that depends on the electromotive force. The inverter 204 is configured to adjust an electric current flowing in the motor 46, namely, by controlling an electrifying current of the motor 46, irrespective of whether the electric current is supplied from the electric power source or generated by the electromotive force, for controlling the motor force. In this respect, each inverter 204 changes a duty ratio, i.e., a ratio of a pulse-on time to a pulse-off time, according to a pulse width modulation (PWM), for thereby adjusting the electrifying current of each motor 46.

The vehicle is provided with: an ignition switch [I/G] 220; a vehicle-speed sensor [v] 222 for detecting a running speed of the vehicle (hereinafter referred to as "vehicle speed" where appropriate); four height sensors [h] 224 each as a movement-amount sensor for detecting the sprung-unsprung distance for the corresponding wheel 12; a vehicle-height change switch [HSw] 226 operated by a vehicle driver for sending directions to change a vehicle height; an operation-angle sensor [δ] 228 for detecting an operation angle of a steering wheel; a longitudinal-acceleration sensor [Gx] 230 for detecting actual longitudinal acceleration generated actually in the vehicle body; a lateral-acceleration sensor [Gy] 232 for detecting actual lateral acceleration generated actually in the vehicle body; four sprung-vertical-acceleration sensors [Gzs] 234 respectively for detecting vertical acceleration of the mount portions 24 of the vehicle body corresponding to the respective wheels 12; four unsprung-vertical-acceleration sensors [Gzg] 236 respectively for detecting vertical acceleration of the respective wheels 12; a throttle sensor [Sr] 238 for detecting a degree of opening of an accelerator throttle; a brake-pressure sensor [Br] 240 for detecting a master cylinder pressure of a brake system; and four resolvers [θ] 242 each as a motor-operation-amount sensor for detecting a rotational angle of each motor 46. These sensors and switches are connected to the computer of the ECU 200. The ECU 200 is configured to control the operation of each spring-absorber Assy 20 based on signals sent from these sensors and switches. The symbol in each square bracket is used in the drawings to indicate the corresponding sensor or switch. In the ROM of the computer of the ECU 200, there are stored programs relating to the control of the actuators 30, various data and so on.

2. Control in Suspension System

In the present suspension system 10, the four spring-absorber Assys 20 can be controlled independently of each other. In the four spring-absorber Assys 20, the actuator force of the actuator 30 is independently controlled, whereby there is executed a control for damping vibrations of the vehicle body and the wheel 12, namely, a vibration of the sprung portion (i.e., sprung vibration) and a vibration of the unsprung portion (i.e., unsprung vibration). The control is hereinafter referred to as "vibration damping control" where appropriate. Further, there are executed: a control for restraining roll of the vehicle body that arises from turning of the vehicle (hereinafter referred to as "roll restrain control") and (b) a control for restraining pitch of the vehicle body that arises from acceleration and deceleration of the vehicle (hereinafter referred to as "pitch restrain control"). Initially, a required acting force that is required to act between the sprung portion and the unsprung portion is obtained by summing a vibration damping component in the vibration damping control, a roll restrain component in the roll restrain control, and a pitch restrain component in the pitch restrain control, each of which is a component of the actuator force in the corresponding control. Then a target actuator force is determined such that a force that actually acts between the sprung portion and the unsprung portion becomes equal to the required acting force, and the actuator 30 is controlled to generate the target actuator force. Thus, the above-indicated vibration damping control, roll restrain control, and pitch restrain control are synthetically executed. In the following explanation, the actuator force and its component are positive values when corresponding to a force in a direction (i.e., a rebound direction) in which the sprung portion and the unsprung portion are moved away from each other and negative values when corresponding to a force in a direction (i.e., a bound direction) in which the sprung portion and the unsprung portion are moved toward each other.

i) Vibration Damping Control

In the vibration damping control, the vibration damping component $f_V$ of the actuator force is determined to generate an actuator force having a magnitude corresponding to the speed of the vibration of the vehicle body and the wheel 12 to be damped. That is, the vibration damping control is a control in which a control based on the so-called skyhook theory and a control based on the quasi groundhook damper theory are synthetically executed. More specifically, the vibration damping component $f_V$ is calculated according to the following formula on the basis of: (1) a movement speed of the mount portion 24 in the vertical direction obtained from the sprung vertical acceleration that is detected by the sprung-vertical-acceleration sensor 234 disposed on the mount portion 24, i.e., the so-called sprung absolute speed $V_S$; and (2) a movement speed of the wheel 12 in the vertical direction obtained from the unsprung vertical acceleration that is detected by the unsprung-vertical-acceleration sensor 236 disposed on the lower arm 22, i.e., the so-called unsprung absolute speed Vg:

$$f_V = C_S \cdot V_S - C_g \cdot V_g$$

In the above formula, Cs is a gain for generating a damping force in accordance with the movement speed of the mount portion 24 in the vertical direction and Cg is a gain for generating a damping force in accordance with the movement speed of the wheel 12 in the vertical direction. That is, the gains $C_S$, Cg may be considered damping coefficients with respect to the so-called sprung absolute vibration and unsprung absolute vibration, respectively.

a) Roll Restrain Control

Upon turning of the vehicle, the sprung portion and the unsprung portion located on the inner side with respect to the turning are moved away from each other while the sprung portion and the unsprung portion located on the outer side with respect to the turning are moved toward each other, due to the roll moment that arises from the turning. In the roll restrain control, the actuator 30 located on the inner side with respect to the turning is controlled to generate, as the roll restrain force, the actuator force in the bound direction while the actuator 30 located on the outer side with respect to the turning is controlled to generate, as the roll restrain force, the actuator force in the rebound direction, for restraining the relative movement of the sprung portion and the unsprung portion, located on the inner side with respect to the turning, away from each other and for restraining the relative movement of the sprung portion and the unsprung portion, located on the outer side with respect to the turning, toward each other. More specifically, control-use lateral acceleration Gy* to be used in the control is determined as lateral acceleration indicative of the roll moment that the vehicle body receives, according to the following formula, on the basis of: (1) estimated lateral acceleration Gyc that is estimated based on the operation angle δ of the steering wheel and the vehicle speed v; and (2) actual lateral acceleration Gyr that is actually measured by the lateral-acceleration sensor 232:

$$Gy^* = K_1 \cdot Gyc + K_2 \cdot Gyr (K_1, K_2 : \text{gains})$$

The roll restrain component $f_R$ is determined based on the thus determined control-use lateral acceleration Gy*, according to the following formula:

$$f_R = K_3 \cdot Gy^* (K_3 : \text{gain})$$

iii) Pitch Restrain Control

When the vehicle body nose-dives upon deceleration such as upon braking, the sprung portions and the unsprung portions located on the front-wheel side of the vehicle are moved toward each other while the sprung portions and the unsprung portions located on the rear-wheel side of the vehicle are moved away from each other, due to pitch moment that causes the nose dive. When the vehicle body squats upon acceleration, the sprung portions and the unsprung portions located on the front-wheel side of the vehicle are moved away from each other while the sprung portions and the unsprung portions located on the rear-wheel side of the vehicle are moved toward each other, due to pitch moment that causes the squat. In the pitch restrain control, the actuator force is generated as the pitch restrain force to restrain or suppress a change in the sprung-unsprung distance, upon the nose dive and the squat. More specifically, actual longitudinal acceleration Gx that is actually measured by the longitudinal-acceleration sensor 230 is used as longitudinal acceleration indicative of pitch moment that the vehicle body receives. On the basis of the actual longitudinal acceleration Gx, the pitch restrain component $f_P$ is determined according to the following formula:

$$f_P = K_4 \cdot Gx (K_4 : \text{gain})$$

The pitch restrain control is executed when the degree of opening of the throttle detected by the throttle sensor 238 exceeds a prescribed threshold or the master cylinder pressure detected by the brake-pressure sensor 240 exceeds a prescribed threshold.

iv) Determination of Required Acting Force

After the vibration damping component $f_V$, the roll restrain component $f_R$, and the pitch restrain component $f_P$ have been determined as described above, the required acting force $f_N$ that is required to act between the sprung portion and the unsprung portion is determined on the basis of those components according to the following formula:

$$f_N = f_V + f_R + f_P$$

On the basis of the thus determined required acting force $f_N$, the target actuator force f* that is the actuator force required to be generated by the actuator 30 is determined. In the present suspension system 10, the connecting mechanism 32 including the compression coil springs 96, 100 and the damper 70 are disposed in series with the actuator 30. Accordingly, the actuator force is transmitted between the sprung portion and the unsprung portion via the connecting mechanism 32. In the present system 10, therefore, the target actuator force f* is determined considering the transmission characteristic of the spring·absorber Assy 20 relating to the transmission of the actuator force to the sprung portion and the unsprung portion via the connecting mechanism 32.

v) Transmission Characteristic

Figure 3:
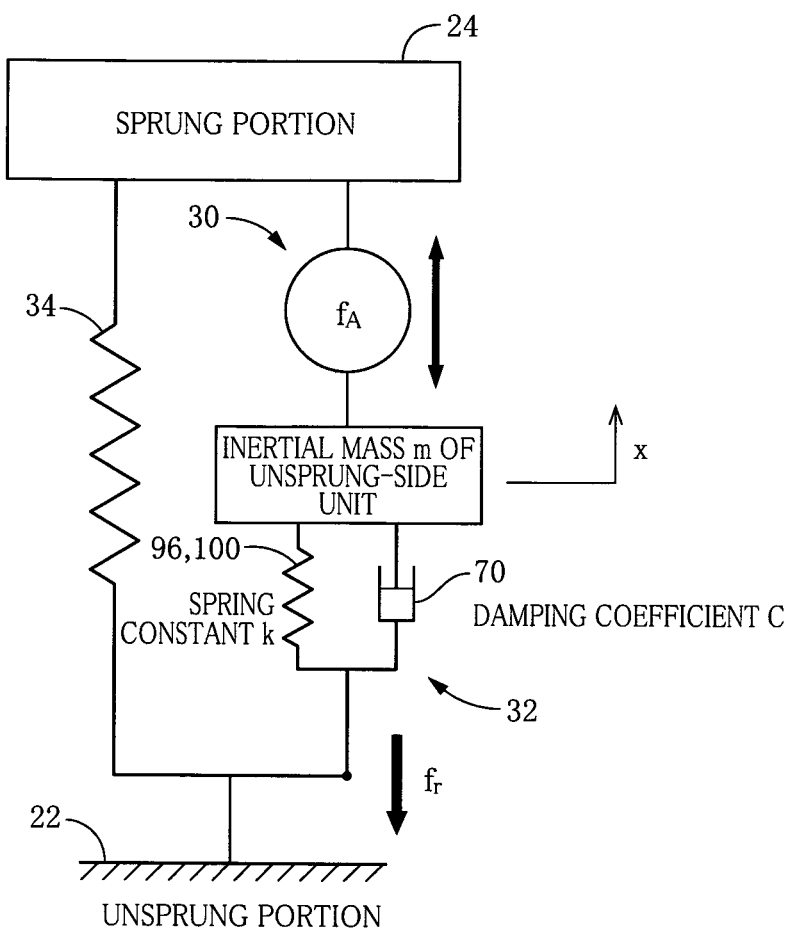
FIG. 3 is a modeled view of the spring-absorber Assy of FIG. 2.

Hereinafter, the transmission characteristic of the spring·absorber Assy 20 will be explained in detail. FIG. 3 is a modeled view of the spring·absorber Assy 20. Where an actuator force is defined as "$f_A(t)$" and a displacement amount of the unsprung-side unit relative to the unsprung portion is defined as "$x(t)$" by using time "t" as a parameter, an equation of motion with regard to the unsprung-side unit is represented as follows. The displacement amount $x(t)$ is positive when the unsprung-side unit is displaced upward.

$$m \cdot d^2x(t)/dt^2 + C \cdot dx(t)/dt + k \cdot x(t) = -f_A(t) \quad (1)$$

In the above equation, "m" represents inertial mass of the unsprung-side unit, "C" represents the damping coefficient of the damper 70, and "k" represents a spring constant in an instance where the two compression coil springs 96, 100 are supposed to constitute one spring. The above equation (1) is subjected to Laplace transformation using, as a parameter, "s" which is a Laplace operator, whereby the following formula is obtained:

$$X(s) = -1/(m \cdot s^2 + C \cdot s + k) \cdot F_A(s) \quad (2)$$

It is noted that "$X(s)$" and "$F_A(s)$" are functions obtained by Laplace transformation of "$x(t)$" and $f_A(t)$, respectively. That is, a first transfer function $G_1(s)$ is represented as $G_1(s) = -1/(m \cdot s^2 + C \cdot s + k)$. The first transfer function is a transfer function by which is outputted the displacement amount of the unsprung-side unit relative to the unsprung portion when the actuator force is inputted.

Where an actual acting force which actually acts on the unsprung portion is defined as "$fr(t)$" while the displacement amount of the unsprung-side unit relative to the unsprung portion is defined as "$x(t)$ as described above, an equation of motion with regard to the unsprung portion is represented as follows:

$$fr(t) = -C \cdot dx(t)/dt - k \cdot x(t) \quad (3)$$

The following formula (4) is obtained by Laplace transformation of the above equation (3):

$$Fr(s) = -(C \cdot s + k) \cdot X(s) \quad (4)$$

It is noted that "$Fr(s)$" is a function obtained by Laplace formation of $fr(t)$. That is, a second transfer function $G_2(s)$ is represented as $G_2(s) = -(C \cdot s + k)$. The second transfer function is a transfer function by which is outputted the actual acting force when the displacement amount of the unsprung-side unit relative to the unsprung portion is inputted. By substituting the formula (2) into the formula (4), the following formula is obtained:

$$Fr(s) = \{(C \cdot s + k)/(m \cdot s^2 + C \cdot s + k)\} \cdot F_A(s) \quad (5)$$

Since the actuator force $f_A(t)$ that is required to be generated by the actuator 30 is determined such that the actual acting force $fr(t)$ becomes equal to the required acting force $f_N$, the actuator force is calculated according to the following formula:

$$F_A(s) = \{(m \cdot s^2 + C \cdot s + k)/(C \cdot s + k)\} \cdot Fr(s) \quad (6)$$

vi) Determination of Target Actuator Force

In the model shown in FIG. 3, the unsprung portion is fixed, and only the movement of the unspring-side unit relative to the unsprung portion is taken into account. However, since the spring·absorber Assy 20 is being displaced at all times due to the input from the wheel, it is desirable to take account of an influence of the displacement of the unsprung portion. Accordingly, a model of the spring·absorber Assy 20 shown in FIG. 4 in which the unsprung portion is displacing is considered while defining absolute displacement of the unsprung portion as "$x_1(t)$". According to the model, the unsprung-side unit can be considered to have an inertial force having a magnitude in accordance with the unsprung-vertical acceleration $dx_1(t)/dt$. Therefore, $F^*(s)$ which is obtained by Laplace transformation of the target actuator force NO is represented by the following formula while considering the inertial force $m \cdot dx_1(t)/dt$ whose magnitude corresponds to the unsprung vertical acceleration of the unsprung-side unit:

$$F^*(s) = \{(m \cdot s^2 + C \cdot s + k)/(C \cdot s + k)\} \cdot F_N(s) - m \cdot s^2 \cdot X_1(s) \quad (7)$$

Accordingly, the target actuator force is determined on the basis of an output value indicative of the actuator force when the required acting force is inputted into a composite transfer function $G(s) = (m \cdot s^2 + C \cdot s + k)/(C \cdot s + k)$ which is set as a reciprocal function of a function that is a product of the first transfer function and the second transfer function; and the inertial force of the unsprung-side unit with respect to the displacement of the unsprung portion.

Figure 4:
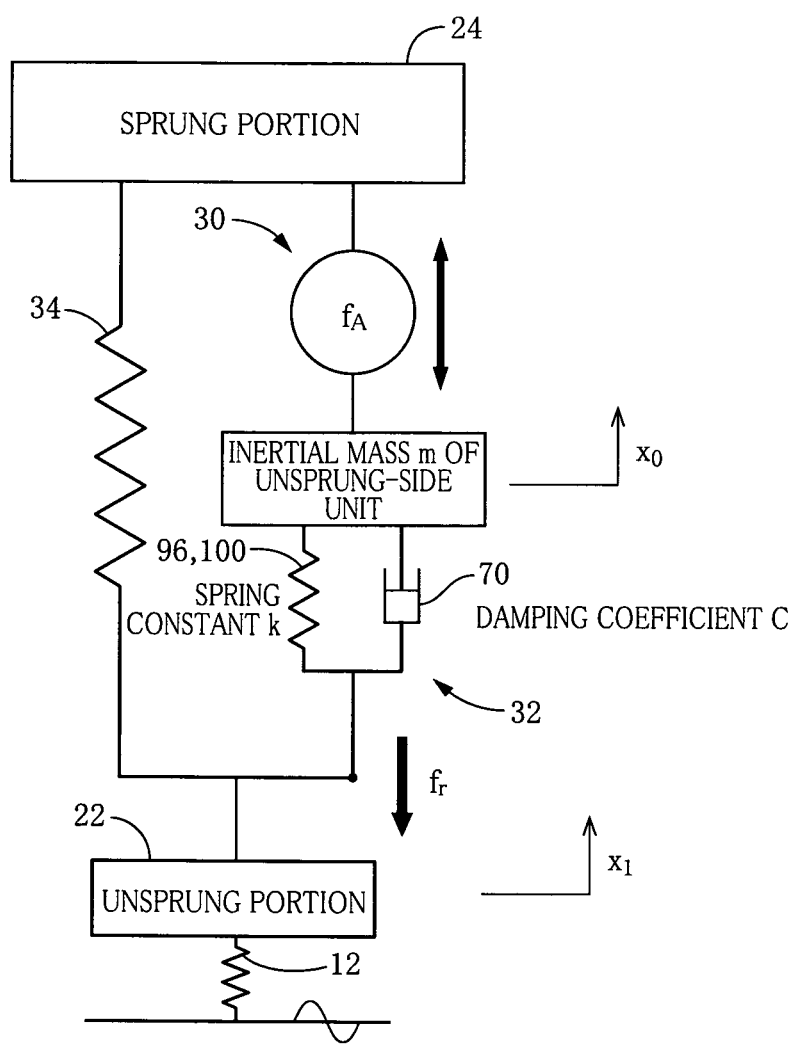
FIG. 4 is a modeled view of the spring-absorber Assy of FIG. 2 in an instance where a displacement of an unsprung portion is taken into account.

An equation of motion with regard to the unsprung-side unit and an equation of motion with regard to the unsprung portion, according to the model shown in FIG. 4, are represented by the following formulas (8) and (9), respectively:

$$m \cdot d^2x_0(t)/dt^2 = -f_A(t) - C \cdot \{dx_0(t)/dt - dx_1(t)/dt\} - k \cdot \{x_0(t) - x_1(t)\} \quad (8)$$

$$fr(t) = -C \cdot \{dx_0(t)/dt - dx_1(t)/dt\} - k \cdot \{x_0(t) - x_1(t)\} \quad (9)$$

The following formulas (10) and (11) are obtained by Laplace transformation of the above formulas (8) and (9), respectively:

$$m \cdot s^2 \cdot X_0(s) = -F_A(s) - C \cdot s \cdot \{X_0(s) - X_1(s)\} - k \cdot \{X_0(s) - X_1(s)\} \quad (10)$$

$$Fr(s) = -C \cdot s \cdot \{X_0(s) - X_1(s)\} - k \cdot \{X_0(s) - X_1(s)\} \quad (11)$$

The above formulas (10) and (11) are organized into the following formula:

$$F_A(s) = \{(m \cdot s^2 + C \cdot s + k)/(C \cdot s + k)\} \cdot Fr(s) - m \cdot s^2 \cdot X_1(s) \quad (12)$$

That is, the formula (12) similar to the formula (7) is obtained.

The above-indicated Laplace transformation is performed on continuous values, namely, analog data. However, the required acting force $f_N$ to be inputted into the composite transfer function $G(s)$ is determined each time when a program that will be explained is executed, and is therefore a discrete value with respect to the pitch time $T_S$ of the execution of the program. Accordingly, the target actuator force is calculated by a transfer function $G(z)$ obtained by discretization of the above-indicated composite transfer function $G(s)$ using the so-called z transformation that can be explained as Laplace transformation on the discrete group.

One example of the z transformation will be briefly explained. "$a_{n+1}$" is defined as "$z \cdot a_n$", i.e., $a_{n+1} = z \cdot a_n$, where data at a certain time $t_n$ is defined as "a" and a sampling interval is defined as "$T_s$" and an operator "z" indicative of the order of the discrete data is used. Approximation of "$da(t_n)/dt$" using the discrete data provides the following formula:

$$da(t_n)/dt = (a_n - a_{n-1})/T_s \quad (13)$$

The above formula (13) is transformed using "$a_{n+1} = z \cdot a_n$", so that the following formula is obtained:

$$da(t_n)/dt = \{(1 - z^{-1})/T_s\} \cdot a_n \quad (14)$$

Further, Laplace transformation of "$da(t_n)/dt$" provides "$s \cdot A(s)$". That is, the Laplace operator "s" in the formula (7) is substituted by "$(1-z^{-1})/T_s$," and "$F^*(s)$" and "$F_N(s)$" in the formula (7) are respectively transformed into "$f^*$" and "$f_N$" each as the discrete data, so as to obtain the following formula:

$$f^* = G(z) \cdot f_N - m \cdot Gzg \qquad (15)$$

Since "$s^2 \cdot X_1(s)$" represents the unsprung vertical acceleration, "$s^2 \cdot X_1(s)$" is substituted by the unsprung vertical acceleration Gzg detected by the unsprung-vertical-acceleration sensor 236. In this respect, the current output value of "$G(z)$" is calculated using the current input value and the previous input value and the previous output value. Thus, calculation according to the formula (15) is performed, whereby the target actuator force f* is determined.

As described above, the damper 70 is configured such that its damping coefficient C is made different depending upon the direction of contraction and extension. Accordingly, the first transfer function and the second transfer function are changed depending upon the direction of the relative movement of the unsprung-side unit and the unsprung portion. More specifically, the damping coefficient C of the damper 70 set in each of the first transfer function and the second transfer function is selectively changed between the damping coefficient Cc in an instance where the unsprung-side unit and the unsprung portion are moved toward each other and the damping coefficient Ct in an instance where the unsprung-side unit and the unsprung portion are moved away from each other. The relative displacement of the unsprung-side unit and the unsprung portion is a difference between: an amount of the movement of the sprung portion and the unsprung portion toward and away from each other detected by the height sensor 224; and an amount of the relative movement of the sprung-side unit and the unsprung-side unit estimated from the detection result of the resolver 242. Accordingly, the direction of the relative movement of the unsprung-side unit and the unsprung portion is estimated based on the detection results of the height sensor 224 and the resolver 242.

The actuator 30 is controlled to generate the target actuator force f* determined as described above. The operation of the motor 46 for generating the target actuator force f* is controlled by the inverter 204. More specifically, a target duty ratio is determined based on the thus determined target actuator force f*, and a command based on the determined duty ratio is sent to the inverter 204. The switching elements of the inverter 204 are controlled to be opened and closed under the appropriate duty ratio, whereby the motor 46 is driven so as to generate the target actuator force f*.

vii) Height Changing Control

In the present suspension system 10, there is also executed a control for changing, by the air springs 34, the height of the vehicle based on an intension of the driver in an attempt to deal with running on a road surface with a high degree of unevenness, for instance. The control is hereinafter referred to as "height changing control" where appropriate. The height changing control will be briefly explained. The height changing control is executed when a target height which is one of predetermined heights to be realized is changed by an operation of a vehicle-height change switch 226 based on the intention of the driver. For each of the predetermined heights, a target sprung-unsprung distance for each of the four wheels 12 is set in advance. The operation of the air supply and discharge device 160 is controlled such that the sprung-unsprung distances for the respective wheels 12 become equal to the respective target distances, based on the values detected by the respective height sensors 224, whereby the sprung-unsprung distances for the respective wheels 12 are suitably changed in accordance with the target height. In the height changing control, there is also executed the so-called auto leveling for coping with a change in the vehicle height due to a change in the number of passengers riding on the vehicle, a change in the weight of cargos carried by the vehicle, and the like.

3. Control Program

Figure 5:
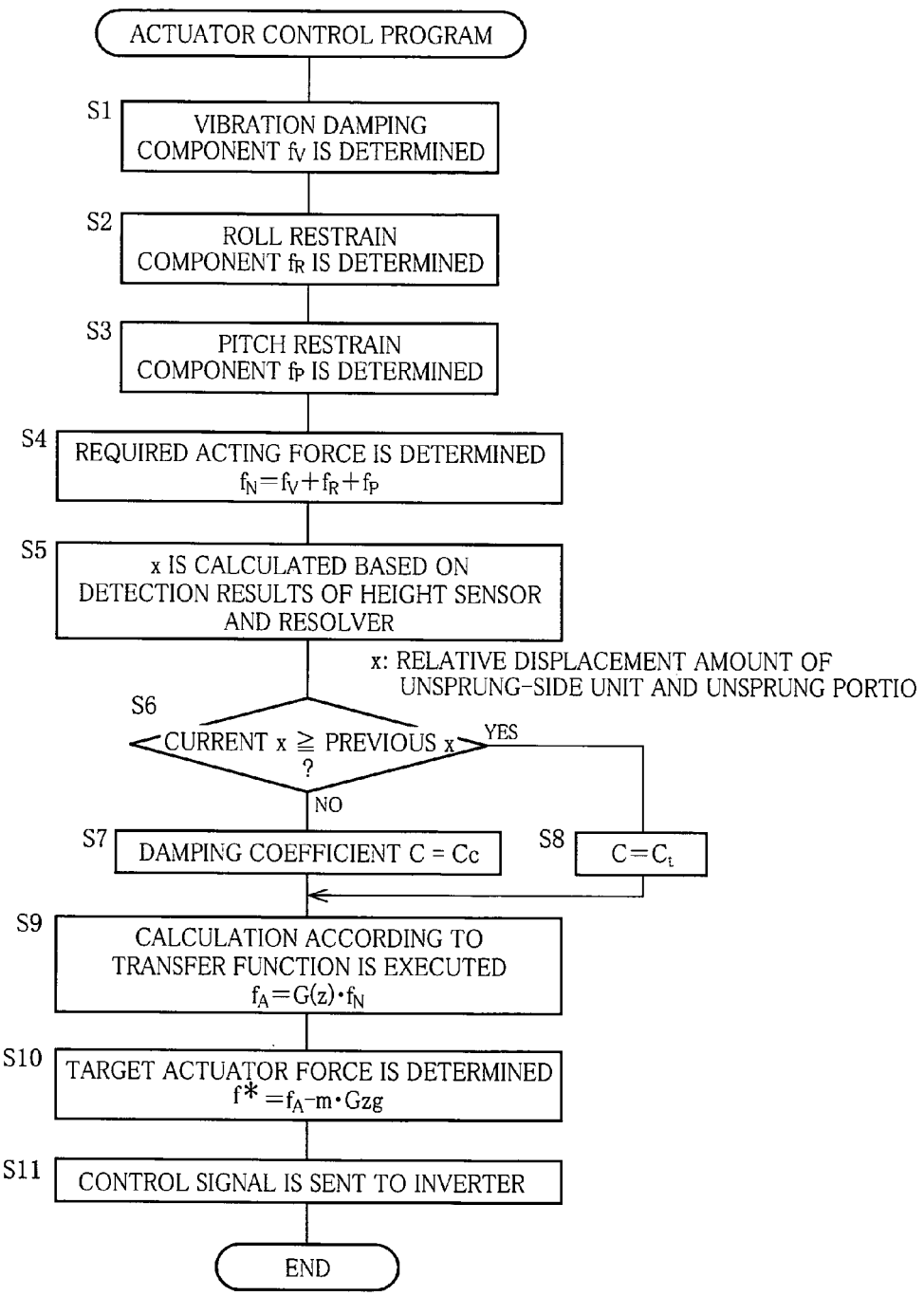
FIG. 5 is a flow chart showing an actuator control program executed by a suspension electronic control unit shown in FIG. 1.
Figure 6:
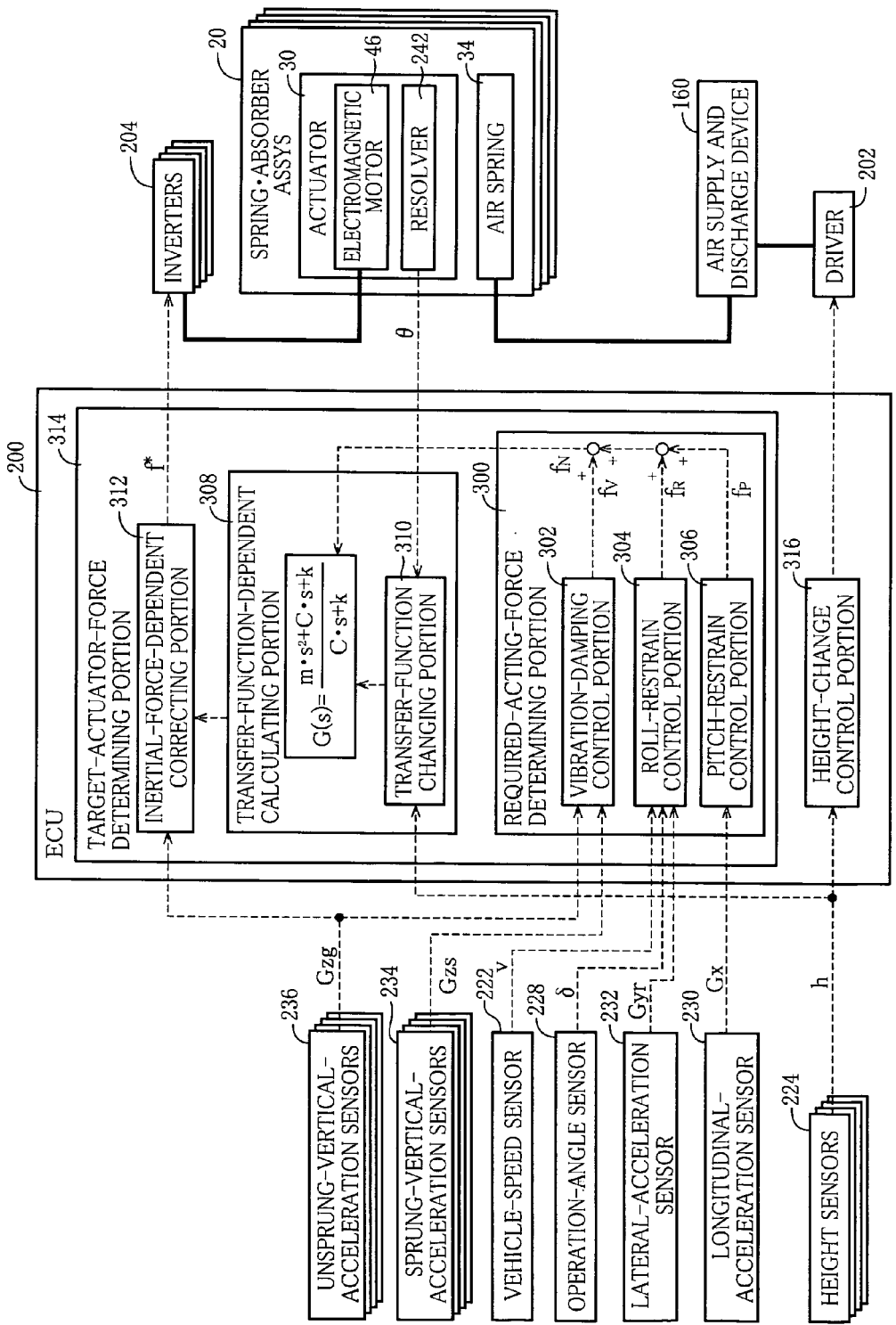
FIG. 6 is a block diagram showing functions of a controller of the suspension system of FIG. 1.

The control of the actuator 30 explained above is executed such that an actuator control program indicated by a flow chart of FIG. 5 is repeatedly implemented by the ECU 200 at the pitch time $T_s$, e.g., from several milliseconds to several tens of milliseconds, with an ignition switch 220 of the vehicle placed in an ON state. Hereinafter, there will be briefly explained the flow of the control referring to the flow chart. The actuator control program is executed for each of the four actuators 30 of the respective spring-absorber Assys 20 provided for the respective four wheels 12. In the following description, there will be explained processing by the program executed on one of the four actuators 30, for the interest of brevity.

In the actuator control program, the vibration damping component $f_V$, the roll restrain component $f_R$, and the pitch restrain component $f_P$ are determined in step S1 (hereinafter "step" is omitted where appropriate) through S3, according to the manner explained above. Next, S4 is implemented to sum up those three components, $f_V$, $f_R$, $f_P$, thereby determining the required acting force $f_N$ that is required to act between the sprung portion and the unsprung portion. Subsequently, in S5, the relative displacement amount x of the unsprung-side unit and the unsprung portion is obtained from a difference between: the amount of the movement of the sprung portion and the unsprung portion toward and away from each other that is obtained from the detection result of the height sensor 224; and the relative movement amount of the sprung-side unit and the unsprung-side unit that is estimated from the detection result of the resolver 242. In S6, the current relative displacement amount and the previous relative displacement amount are compared with each other, and the direction of the relative movement of the unsprung-side unit and the unsprung portion is estimated. Where it is estimated that the unsprung-side unit and the unsprung portion are moved toward each other, S7 is implemented to set the damping coefficient C of the damper 70 at Cc. Where it is estimated that the unsprung-side unit and the unsprung portion are moved away from each other, S8 is implemented to set the damping coefficient C of the damper 70 at Ct.

Subsequently, in S9, there is executed the calculation according to the transfer function $G(s)=(m \cdot s^2+C \cdot s+k)/(C \cdot s+k)$ explained above, whereby the actuator force $f_A$ to be generated by the actuator 30 according to the required acting force $f_N$ determined in S4 as the input value is outputted. Next, in S10, the target actuator force f* ($=f_A-m \cdot Gzg$) is determined taking account of the inertial force $m \cdot Gzg$ of the unsprung-side unit with respect to the displacement of the unsprung portion. S10 is followed by S11 in which the duty ratio for controlling the motor 46 is determined on the basis of the determined actuator force f*, and a command on the basis of the duty ratio is sent to the inverter 204. Owing to the processing, the operation of the motor 46 of each actuator 30 is controlled, so that each actuator 30 generates the actuator force to be required.

4. Functional Structure of Controller

The ECU 200 that executes the above-indicated control of each actuator 30 is considered to have various functional portions for executing various sorts of processing. To be more specific, the ECU 200 includes a functional portion for determining the required acting force by executing the processing in S1-S4 of the above-indicated actuator control program, namely, a required-acting-force determining portion 300. The required-acting-force determining portion 300 includes: a vibration-damping control portion 302 as a functional portion to determine the vibration damping component $f_V$; a roll-restrain control portion 304 as a functional portion to determine the roll restrain component $f_R$; and a pitch-restrain control portion 306 as a functional portion to determine the pitch restrain component $f_P$. The ECU 200 includes a transfer-function-dependent calculating portion 308 as a functional portion to calculate according to the composite transfer function to which the required acting force is inputted and which is set as the reciprocal function of the function that is a product of the first transfer function and the second transfer function. A portion that executes the processing in S5-S9 of the program corresponds to the transfer-function-dependent calculating portion 308. The transfer-function-dependent calculating portion 308 includes a transfer-function changing portion 310 which executes the processing in S5-S8 of the program and which changes the first transfer function and the second transfer function by changing the damping coefficient of the damper depending upon the direction of the relative movement of the unsprung-side unit and the unsprung portion. The ECU 200 further includes an inertial-force-dependent correcting portion 312 which executes the processing in S10 of the program and which corrects, on the basis of the inertial force of the unsprung-side unit with respect to the displacement of the unsprung portion, the output value indicative of the actuator force outputted from the transfer-function-dependent calculating portion 308, so as to determine the target actuator force. A target-actuator-force determining portion 314 is constituted by including the required-acting-force determining portion 300, the transfer-function-dependent calculating portion 308, and the inertial-force-dependent correcting portion 312. The ECU 200 further includes a height-change control portion 316 which performs changing of the vehicle height by the air springs 34.

In the present suspension system 10, the target actuator force is determined on the basis of: (a) the required acting force that is required to act between the sprung portion and the unsprung portion by the actuator 30 and the connecting mechanism 32; and (b) the inertial force of the unsprung-side unit with respect to the displacement of the unsprung portion, while utilizing: the first transfer function that is a transfer function by which is outputted the displacement amount of the unsprung-side unit relative to the unsprung portion when the actuator force is inputted; and the second transfer function that is a transfer function by which is outputted the actual acting force that is a force which actually acts between the sprung portion and the unsprung portion when the displacement amount is inputted. Accordingly, the arrangement ensures an appropriate force that actually acts on the sprung portion and the unsprung portion as a result of transmission of the actuator force via the connecting mechanism 32. In other words, the present system 10 prevents deterioration in the riding comfort of the vehicle, the steerability and the stability of the vehicle, and so on which arises from the serial arrangement of the connecting mechanism with respect to the actuator.

MODIFIED EMBODIMENT

In the system according to the illustrated embodiment, the target-actuator-force determining portion is configured such that the required acting force is inputted into the composite transfer function G(s) set as the reciprocal function of the function that is a product of the first transfer function and the second transfer function, as shown in FIG. 7(a). The target-actuator-force determining portion may be configured such that the target actuator force is calculated using a composite transfer function H(s) shown in FIG. 7(b). The composite transfer function H(s) is a transfer function that is approximate to the transfer function G(s) in the illustrated embodiment and is represented as follows:

$$H(s)=G'(s)/\{1+G'(s) \cdot A(s)\}$$

In the above formula, "G'(s)" and "A(s)" are transfer functions represented by the following formulas, respectively:

$$G'(s)=P+I/s+D \cdot s$$

$$A(s)=(C \cdot s+k)/(m \cdot s^2+C \cdot s+k)$$

In the above formulas, "P", "I", and "D" are a proportional gain, an integral gain, and a differential gain, respectively, and are set at suitable values so as to be approximate to the transfer function G(s) in the illustrated embodiment. The transfer function G(s) in the illustrated embodiment is a linear function with respect to "s" while the transfer function A(s) in the modified embodiment is a function having a term "1/s". Accordingly, the transfer function A(s) in the modified embodiment ensures stable calculation, as compared with the transfer function G(s) in the illustrated embodiment.

The invention claimed is:

1. A suspension system for a vehicle, comprising:
an electromagnetic actuator including:
a sprung-side unit connected to a sprung portion;
an unsprung-side unit which is connected to an unsprung portion and which is movable relative to the sprung-side unit in association with a movement of the sprung portion and the unsprung portion toward and away from each other; and
an electromagnetic motor, the actuator being configured to generate, based on a force of the electromagnetic motor, an actuator force that is a force with respect to a relative movement of the sprung-side unit and the unsprung-side unit;
a suspension spring which is disposed in parallel with the electromagnetic actuator and which connects the sprung portion and the unsprung portion and which elastically supports the sprung portion and the unsprung portion relative to each other;
a connecting mechanism which includes a support spring that connects:
one of the sprung-side unit and the unsprung-side unit; and
one of the sprung portion and the unsprung portion to permit said one of the sprung-side unit and the unsprung-side unit to be elastically supported by said one of the sprung portion and the unsprung portion, the support spring being different from the suspension spring and disposed in series with the electromagnetic actuator; and
a controller which includes a target-actuator-force determining portion configured to determine, according to a prescribed control rule, a target actuator force that is the actuator force required to be generated by the actuator, the controller being configured to control the actuator force to be generated by the actuator, based on the target actuator force,
wherein the target-actuator-force determining portion is configured to determine the target actuator force on the basis of: (a) a required acting force that is a force required to act between the sprung portion and the unsprung portion by the actuator and the connecting mechanism; and (b) an inertial force of said one of the sprung-side unit and the unsprung-side unit with respect to a displacement of said one of the sprung portion and the unsprung portion, while utilizing: a first transfer function that is a transfer function by which is outputted an amount of a relative displacement of said one of the sprung-side unit and the unsprung-side unit relative to said one of the sprung portion and the unsprung portion when the actuator force is inputted, the relative displacement being generated from the support spring permitting said one of the sprung-side unit and the unsprung-side unit to be elastically supported by said one of the sprung portion and the unsprung portion; and a second transfer function that is a transfer function by which is outputted an actual acting force that is a force which actually acts between the sprung portion and the unsprung portion when the amount of the relative displacement is inputted.

2. The suspension system according to claim 1,
wherein a composite transfer function is set as a reciprocal function of a function that is a product of the first transfer function and the second transfer function, and
wherein the target-actuator-force determining portion is configured to determine the target actuator force on the basis of: an output value obtained by inputting the required acting force into the composite transfer function; and the inertial force.

3. The suspension system according to claim 2, wherein the target-actuator-force determining portion is configured to determine the target actuator force according to a relationship between the output value obtained by inputting the required acting force into the composite transfer function and the inertial force, the relationship indicating that a difference between the output value and the target actuator force corresponds to the inertial force.

4. The suspension system according to claim 1,
wherein the connecting mechanism is configured to connect: the unsprung-side unit as said one of the sprung-side unit and the unsprung-side unit; and the unsprung portion as said one of the sprung portion and the unsprung portion and is configured such that the support spring permits the unsprung-side unit to be elastically supported by the unsprung portion, and
wherein the target-actuator-force determining portion is configured to determine the target actuator force on the basis of the required acting force and the inertial force of the unsprung-side unit with respect to a displacement of the unsprung portion, while utilizing: the first transfer function by which is outputted an amount of a relative displacement of the unsprung-side unit relative to the unsprung portion when the actuator force is inputted; and the second transfer function by which is outputted the actual acting force that is a force which actually acts between the sprung portion and the unsprung portion when the amount of the relative displacement is inputted.

5. The suspension system according to claim 1, wherein the connecting mechanism includes a damper disposed in parallel with the support spring and configured to generate a damping force with respect to a relative movement of said one of the sprung-side unit and the unsprung-side unit and said one of the sprung portion and the unsprung portion.

6. The suspension system according to claim 5, wherein the first transfer function and the second transfer function are set based on a damping coefficient of the damper.

7. The suspension system according to claim 6, wherein the damper is configured such that the damping coefficient thereof is made different depending upon a direction of the relative movement of said one of the sprung-side unit and the unsprung-side unit and said one of the sprung portion and the unsprung portion, and wherein the target-actuator-force determining portion is configured to change the first transfer function and the second transfer function to be utilized, depending upon the direction of the relative movement.

8. The suspension system according to claim 7, further comprising:
a movement-amount sensor that detects an amount of the movement of the sprung portion and the unsprung portion toward and away from each other; and
a motor-operation-amount sensor that detects an operation amount of the electromagnetic motor,
wherein the target-actuator-force determining portion is configured to estimate the direction of the relative movement of said one of the sprung-side unit and the unsprung-side unit and said one of the sprung portion and the unsprung portion, on the basis of a value detected by the movement-amount sensor and a value detected by the motor-operation-amount sensor.

9. The suspension system according to claim 1, wherein the support spring is disposed between the unsprung-side unit and the unsprung portion.

10. The suspension system according to claim 1, wherein the support spring includes two compression springs.

* * * * *